P. W. REINSHAGEN.
SHAFT COUPLING.

No. 104,884. Patented June 28, 1870.

United States Patent Office.

PETER W. REINSHAGEN, OF CINCINNATI, OHIO, ASSIGNOR TO HIMSELF AND JOHN H. BUCKMAN.

Letters Patent No. 104,884, dated June 28, 1870.

IMPROVEMENT IN SHAFT-COUPLING.

The Schedule referred to in these Letters Patent and making part of the same.

*To all whom it may concern:*

Be it known that I, PETER W. REINSHAGEN, of Cincinnati, Hamilton county, State of Ohio, have invented certain new and useful Improvements in Shaft-Couplings; and I hereby declare the following to be a sufficiently full, clear, and exact description thereof to enable one skilled in the art to which my invention appertains to make and use it, reference being had to the accompanying drawing making part of this specification.

This invention relates to a mode of coupling hollow shafts; and

My improvement consists in stiffening the ends of such shafts before the coupling is secured in place, and locking them together by means of a short solid shaft fitting such ends, as will be more fully explained hereinafter.

In the accompanying drawing—

Figure 1:
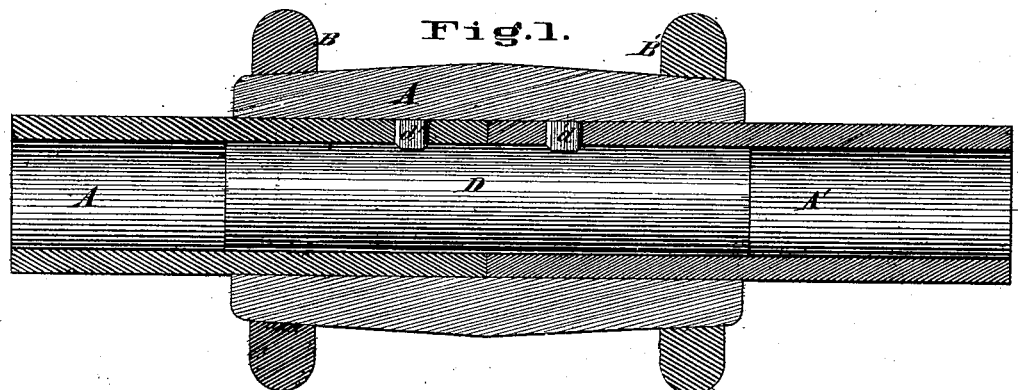
Figure 1 is an axial section of the coupling and hollow shafts, embodying my invention.
Figure 2:
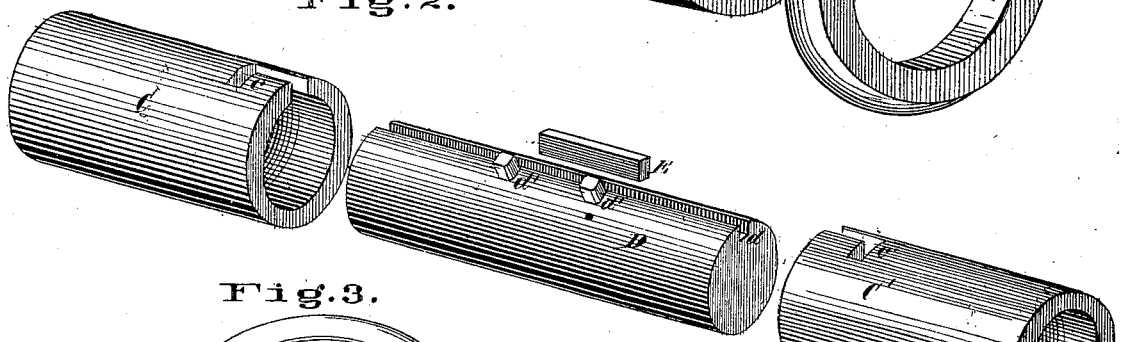
Figure 2 represents in perspective the parts of my coupling, as used for hollow shafts, detached.
Figure 3:
Figure 3 is a cross-section of the coupling in connection with a hollow shaft.

A is a compression-sleeve, of a double conical form exteriorly, as shown, and split at $a$ at one place only, and that the entire length of the sleeve. It is bored to snugly fit the shafts it is designed to couple, and, when compressed in the manner hereinafter described, to tightly enclasp the shafts throughout the entire length of the sleeve.

Rings B B are provided to fit over the ends of the sleeve A, being bored conical to fit snugly the conical exterior of the sleeve.

The coupling is attached by slipping the sleeve A over the junction of the shafts to be coupled, and by simply driving on the rings B B with the common hammer, or otherwise, the sleeve can be so tightly shrunk around the shaft that, in most cases, the additonal security of a "key" or "pins" is unnecessary.

In using this coupling with hollow shafting, I have designed devices for stiffening and locking the ends of the shafts before the exterior coupling is secured in place.

The ends of the shafts C C' are notched at the junction in the form of a letter L, or T, if preferred.

A short shaft, D, is fitted into the ends of the shafts C C' snugly, provided with a "key-seat," $d$, which, for convenience of manufacture, is cut the entire length of the shaft.

A key, E, which is made of a length equal to the depth of the notches $c$ $c'$ together, is fitted into the key-seat $d$ and notches $c$ $c'$, for the purpose of preventing either end of the shafts from revolving in the coupling. The shafts are at the same time prevented from drawing apart by the provision of the pins $d'$, which lock within the inner legs of the notches $c$ $c'$.

When a coupling for the exterior of the shafts, such as is herein described, is used in connection with the interior devices described, the shafts are so firmly coupled that displacement or "working loose" is impossible, and the coupling is readily detachable when necessary.

I claim herein as new and of my invention—

In connection with the notched shaft ends C C' $c$ $c'$, the key-seated shaft D $d$, provided with projecting pins $d'$ $d'$, and loose key or feather E, constructed and combined substantially in the manner and for the purpose described.

In testimony of which invention, I hereunto set my hand.

PETER W. REINSHAGEN.

Witnesses:
FRANK MILLWARD,
I. L. WARTMANN.